United States Patent
Chaudhuri et al.

(10) Patent No.: US 10,387,124 B2
(45) Date of Patent: Aug. 20, 2019

(54) SYSTEM AND METHOD FOR CREATING DOMAIN SPECIFIC LANGUAGE

(71) Applicant: Tata Consultancy Services Limited, Mumbai (IN)

(72) Inventors: Subhrojyoti Roy Chaudhuri, Pune (IN); Swaminathan Natarajan, Pune (IN); Puneet Patwari, Pune (IN); Amar Satyabroto Banerjee, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/936,538

(22) Filed: Mar. 27, 2018

(65) Prior Publication Data
US 2019/0087160 A1 Mar. 21, 2019

(30) Foreign Application Priority Data

Sep. 16, 2017 (IN) .............................. 201721032838

(51) Int. Cl.
*G06F 8/30* (2018.01)
*G06F 8/20* (2018.01)
*G06F 8/35* (2018.01)

(52) U.S. Cl.
CPC .................. *G06F 8/31* (2013.01); *G06F 8/20* (2013.01); *G06F 8/35* (2013.01); *G06F 8/37* (2013.01)

(58) Field of Classification Search
None
See application file for complete search history.

(56) References Cited

U.S. PATENT DOCUMENTS

| 2012/0072886 A1* | 3/2012 | McCabe | G06F 8/31 717/114 |
| 2012/0185874 A1* | 7/2012 | Cookson | G06F 9/4843 719/313 |
| 2013/0031529 A1* | 1/2013 | Bernelas | G06F 8/31 717/114 |
| 2014/0040656 A1* | 2/2014 | Ho | G06F 9/5077 714/3 |
| 2014/0196022 A1* | 7/2014 | Skutin | G06F 8/61 717/176 |

(Continued)

OTHER PUBLICATIONS

Andres, "Domain Specific Languages with Graphical and Textual Views", Springer-Verlag Berlin Heidelberg 2008 (Year: 2008).*

(Continued)

*Primary Examiner* — Hossain M Morshed
(74) *Attorney, Agent, or Firm* — Finnegan, Henderson, Farabow, Garrett & Dunner LLP

(57) ABSTRACT

Engineering environments are provided with standard language. The standard language does not incorporate domain specific vocabulary for different domains. The present invention discloses a method and system for creating domain specific language. The method includes receiving information for a technical problem. Further, creating one or more domain specific concepts based on the information. Further, the method facilitates selection of a design pattern. Subsequently, mapping the domain specific concept to the selected design specific concept to create one or more domain meta-model. Each element of the domain meta-model is translated to create keywords that form the grammar for the domain specific language.

13 Claims, 3 Drawing Sheets

(56) References Cited

U.S. PATENT DOCUMENTS

2016/0274872 A1* 9/2016 Narayanan ............... G06F 8/35

OTHER PUBLICATIONS

Pfeiffer, "A Comparison of Tool Support for Textual Domain-Specific Languages", In Workshop on DomainSpecific Modeling, pp. 1-7, 2008. (Year: 2008).*

Abmann, "Ontologies, Meta-models, and the Model-Driven Paradigm", http://www.springer.com/978-3-540-34517-6, 2006 (Year: 2006).*

Estublier, J. et al. "Domain Specific Engineering Environments," *APSEC '08 15$^{th}$ Asia-Pacific Software Engineering Conference*, 2008, Beijing, China, Dec. 3-5, 2008; 8 pages.

Mannadiar, R. et al. "Domain-Specific Engineering of Domain-Specific Languages," *Proceeding DSM '10 Proceedings of the 10$^{th}$ Workshop on Domain-Specific Modeling*, Reno, Nevada, Oct. 17-21, 2010; 6 pages.

* cited by examiner

SYSTEM AND METHOD FOR CREATING DOMAIN SPECIFIC LANGUAGE

PRIORITY CLAIM

This U.S. patent application claims priority under 35 U.S.C. § 119 to: India Application No. 201721032838, filed on Sep. 16, 2017. The entire contents of the aforementioned application are incorporated herein by reference.

TECHNICAL FIELD

The disclosure herein generally relates to domain specific language, and more particularly, system and method for creating domain specific language.

BACKGROUND

Generally, engineering environments are provided to specify requirements, design and implementation details for solution. The engineering environments are provided in standard language that is utilized by a multiple commercial vendors. However, the standard language does not incorporate domain specific vocabulary for different domains like finance/banking, software. Generally, a problem domain refers to the specific problem or task that a particular software application is designed to perform.

The process of designing a domain specific language is often done by persons who are well experienced in the field of computer science and language analytics. It is often only economical to create domain specific languages for problem domains that are of sufficient scale and complexity to warrant the cost of creating an appropriate domain specific language.

SUMMARY

Embodiments of the present disclosure present technological improvements as solutions to one or more of the above-mentioned technical problems recognized by the inventors in conventional systems. For example, in one embodiment, a method for creating domain specific language is disclosed. The method includes receiving information for a technical problem and creating one or more domain specific concepts by creating knowledge models from the information received from the user. Further selecting a design pattern meta-model to map with the one or more domain specific concept to obtain domain meta-model for creating language structure of domain specific language. Further, translating each element of the domain meta-model to create grammar of the domain specific language.

In another embodiment, a system for creating domain specific language is disclosed. The system includes at least one processor, and a memory communicatively coupled to at least one processor, wherein the memory comprises of several modules. The modules include domain language module that receives information for a technical problem from a user and creates one or more domain specific concepts by creating a plurality of knowledge models from the information received from the user. Further the module selects a design pattern and maps the selected design pattern with the domain specific concepts to obtain domain meta-model for creating language structure of the domain specific language. Further, the module translates each element of the domain meta-model to create grammar of the domain specific language.

In yet another aspect, a non-transitory computer-readable medium having embodied thereon a computer program for executing a method for creating domain specific language is disclosed. The method includes receiving information for a technical problem and creating one or more domain specific concepts by creating knowledge models from the information received from the user. Further selecting a design pattern meta-model to map with the one or more domain specific concept to obtain domain meta-model for creating language structure of domain specific language. Further, translating each element of the domain meta-model to create grammar of the domain specific language.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In one aspect, a method for creating domain specific language is disclosed. The method includes receiving information from the user and creating domain concepts. Further selecting a design pattern and mapping the selected design pattern to the domain concept to create domain meta-model. Subsequently, translating elements of the domain metal model to create grammar for the domain specific language.

The manner in which the described system is implemented to evaluate reviewer's ability to provide feedback has been explained in detail with respect to the following figure(s). While aspects of the described system can be implemented in any number of different computing systems, transmission environments, and/or configurations, the embodiments are described in the context of the following exemplary system.

Figure 1:
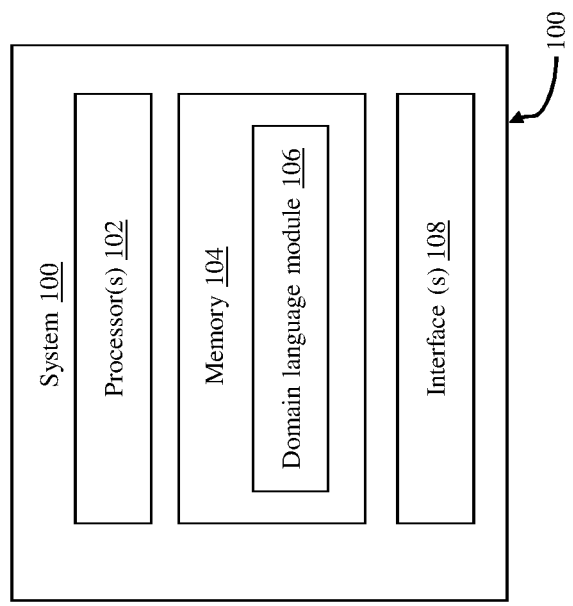
FIG. 1 illustrates a system for creating domain specific language, according to some embodiments of the present the present subject matter.

FIG. 1 schematically illustrates a system 100 for creating domain specific language, according to an embodiment of the present disclosure. As shown in FIG. 1, the system 100 includes one or more processor(s) 102 and a memory 104 communicatively coupled to each other. The memory 104 includes a domain language module 106 (also referred as 'module 106' hereinafter) that creates the domain specific language. The system 100 also includes interface(s) 108. Although FIG. 1 shows example components of the system 100, in other implementations, the system 100 may contain fewer components, additional components, different components, or differently arranged components than depicted in FIG. 1.

The processor(s) 102 and the memory 104 may be communicatively coupled by a system bus. The processor(s) 102 may include circuitry implementing, among others, audio and logic functions associated with the communication. The processor 102 may include, among other things, a clock, an arithmetic logic unit (ALU) and logic gates configured to support operation of the processor(s) 102. The processor(s) 102 can be a single processing unit or a number of units, all of which include multiple computing units. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions and data stored in the memory 104.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 108 may include a variety of software and hardware interfaces, for example, interfaces for peripheral device(s), such as a keyboard, a mouse, an external memory, and a printer. The interface(s) 108 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 108 may include one or more ports for connecting the system 100 to other network devices.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 104, may store any number of pieces of information, and data, used by the system 100 to detect vibrations of a machine. The memory 104 may be configured to store information, data, applications, instructions or the like for system 100 to carry out various functions in accordance with various example embodiments. Additionally or alternatively, the memory 104 may be configured to store instructions which when executed by the processor 102 causes the system 100 to behave in a manner as described in various embodiments. The memory 104 includes the domain language module 106 and other modules. The module 106 include routines, programs, objects, components, data structures, etc., which perform particular tasks or implement particular abstract data types.

Initially the module 106 receives a technical problem and analyzes solution space for the technical problem. An example for the technical problem is to build an environment to facilitate maintenance and control (M&C) engineering.

Figure 2:
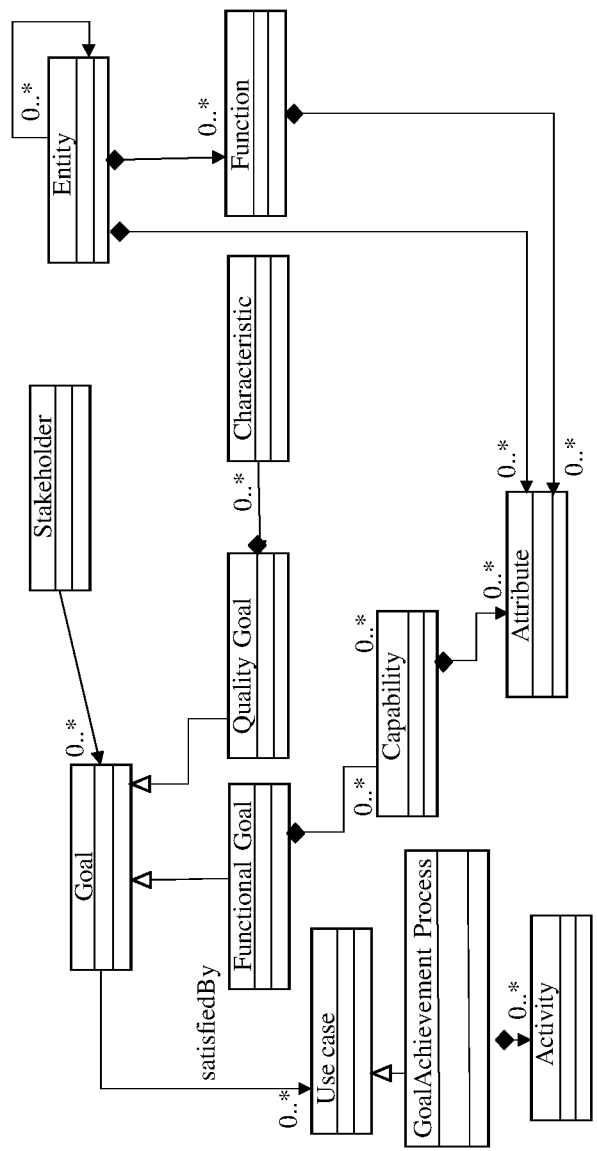
FIG. 2 is an illustration of generic system model, according to some embodiments of the present subject matter.

In an embodiment the method includes extracting domain knowledge of the technical problem using a Generic System Model (GSM). The GSM first takes the domain knowledge of the technical problem as input in a systematic manner from a user. The GSM allows the user to create a plurality of knowledge models about multiple domains and also provide their inter dependencies. FIG. 2 is an illustration of the Generic System Model, according to some embodiments of the present subject matter. The plurality of knowledge models capture domain knowledge from multiple dimensions such as causal, life cycle, eco system subsystems, aspects so on. The specification of the domain knowledge is captured in the form of one or more functions and one or more attributes. The knowledge models are then utilized to create one or more domain specific concepts. The extraction of the one or more domain specific concepts from the gathered domain knowledge leads to the creation of a Domain Meta Model (DMM).

In an embodiment, the module creates dependency between the one or more domain specific concepts. To create dependency between the one or more domain specific concepts, system maps the one or more domain specific concepts to the design pattern. The method of mapping the one or more domain specific concepts with the design pattern includes a method for selecting a suitable design pattern from an existing list of one or more pre-stored design patterns. The method also includes assisting the user in facilitating creation of a new design pattern.

In an embodiment, the method for facilitating the creation of a new design pattern is disclosed. The method includes populating the one or more functions for the one or more domain specific concepts. To create a new design pattern, the system 100 allows the user to define blocks addressing concerns that serve as a basis to map with the functions and attributes in the domain specific concept. An example of the design pattern is a sensor actuator control element (SACE) design pattern and the Block used in the pattern is the ControlNode.

In an embodiment, the mapping between the one or more domain specific concepts and the design patterns is disclosed. The mapping is performed between one or more concerns of the design pattern and the one or more functions that are captured in the plurality of domain specific concepts. For example, the Concern of Command and response (CommandResponse) is mapped to multiple functions like CommandHandling, ResponseHandling etc. Further, the system 100 specifies relationship between the one or more concerns using design pattern meta-model. For example, the concerns of CommandResponse has child and parent relationship.

The steps for mapping the design patterns with the one or more domain specific concepts is as below
    Identifying the blocks as per the design pattern
    Identifying the one or more concerns that the blocks address
    Mapping the concerns which are fulfilled by the functions from the domain specific concept Specifying the relationship between the concerns or blocks Subsequently, a method for generating language structure is disclosed. The method includes utilizing the mapping between the domain specific concept and the selected design pattern. The mapping between the domain specific concept and the selected design pattern, results in a domain meta-model for the target domain specific language. The domain meta-model further helps in creating language structure of the target DSL.

The attributes populated in the one or more domain specific concepts are populated and classified as an interface description. Further, classifying the one or more concerns and grouping the one or more concerns as Blocks. The mapping between the one or more functions and one or more concerns is also restored in the language by creating a plurality of language structures. The relationship between the blocks present in the design pattern model is established using suitable place holders inside the block.

Subsequently, the method includes translating each element of the plurality of language structures of the DSL into a plurality of keywords. The plurality of keywords provides grammar for the DSL.

The grammar containing the plurality of keywords can be translated to target DSL. The target DSL is the language that the user uses to create solution for the identified problem domain. The keywords can be translated to target DSL using third party compiler generators such as XText, Lex/yacc.

In an embodiment, a method for testing the generated grammar and validation is disclosed. The method includes creating a plurality of test meta models for the target DSL utilizing the domain meta model and the mapping of the domain meta model with the plurality of design patterns.

In an embodiment, an example for creating domain specific language is created. An example for the technical problem is to build an environment to facilitate maintenance and control (M&C) engineering. The module 106 creates a specific schema to capture different knowledge aspects that enable collecting, organizing and structure domain knowledge. Primary stakeholder in building the environment to facilitate M&C engineering is M&C engineers. The module 106 determines the scope of the domain as control systems. A thorough understanding of the domain helps in obtaining one or more relevant application spaces. The SACE architecture highlights a generic list of components thereby explicating corresponding specification items that could be provided to end user for selecting the design pattern. The SACE architecture also provides the structure for M&C engineering as hierarchal architecture. Hence the environment expects the specification as hierarchal controllers. This helps the module 106 in obtaining vocabulary and concepts for the DSL. Further, after obtaining relevant vocabulary and domain specific concepts, the relationships are analyzed to create domain meta model.

Figure 3:
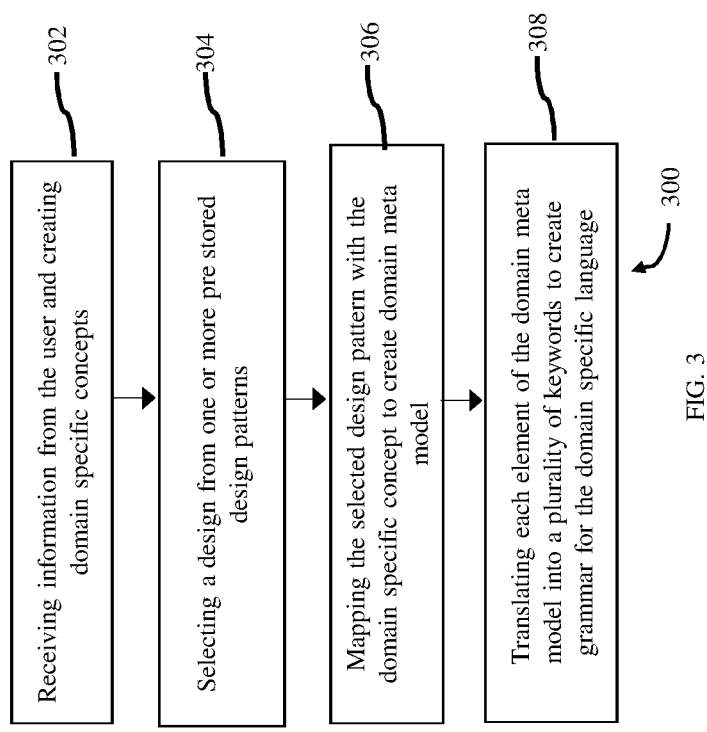
FIG. 3 is a flow chart illustrating a method for creating domain specific language, according to some embodiments of the present subject matter.

FIG. 3 is a flow chart illustrating a method for creating domain specific language, according to some embodiments of the present subject matter. At block 302, information regarding a technical problem is received from user and one or more domain specific concepts are created. At block 304, a design pattern is selected from the one or more pre-stored design patterns. At block 306 mapping the selected design pattern with the domain specific concept to create domain meta-model. Further at block 308, each element of the domain meta-model is translated to a plurality of keywords and grammar for domain specific language is created.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for creating domain specific language, the method comprising of:
receiving domain knowledge of a problem domain from a user and creating one or more domain specific concepts by creating a plurality of knowledge models based on the domain knowledge received from the user, wherein the plurality of knowledge models are created by capturing the domain knowledge from the user using meta models; wherein the domain specific concepts are created in one or more functions and one or more attributes;
selecting a design pattern from one or more pre-stored design patterns;
mapping the selected design pattern to the one or more domain specific concepts using a design pattern meta model to obtain a domain meta model; wherein mapping the selected design pattern with the one or more domain specific concepts comprises:
identifying one or more concerns of the design pattern based on attributes of one or more domain specific concepts;
classifying the one or more concerns and grouping the one or more concerns to define blocks addressing the concerns;
mapping one or more concerns of the design pattern and the one or more functions; wherein the one or more concerns are fulfilled by the functions from the domain specific concept;
specifying a relationship between the one or more concerns or the blocks using the design pattern meta-model; and
translating each element of the obtained domain meta model into a plurality of keywords to create grammar of the domain specific language.

2. The method of claim 1, further comprising of translating the grammar of the domain specific language to obtain in target domain specific language using one or more third party compiler generators.

3. The method of claim 2, further comprising of creating one or more test meta-models to perform testing and simulation of obtained target domain specific language.

4. The method of claim 1, wherein the domain knowledge is received from the user in the form of forms containing questions using generic system model (GSM) meta model that are utilized to create knowledge models.

5. The method of claim 1, wherein selecting a design pattern includes facilitating the user in creating a new design pattern.

6. The method of claim 1, wherein the grammar of the domain specific language is editable for modifications by the user.

7. A system for creating domain specific language, the system comprising of:
at least one processor;
a memory communicatively coupled to the at least one processor, wherein the memory comprises of a domain language module which is executed by the at least one processor to:
receive domain knowledge of a problem domain from a user and creating one or more domain specific concepts by creating a plurality of knowledge models based on the domain knowledge received from the user wherein the plurality of knowledge models are created by capturing the domain knowledge from the user using meta models; wherein the domain specific concepts are created in one or more functions and one or more attributes;
select a design pattern from one or more pre-stored design patterns;
map the selected design pattern to the one or more domain specific concepts using a design pattern meta model to obtain a domain meta model;
wherein mapping the selected design pattern with the one or more domain specific concepts comprises:
identifying one or more concerns of the design pattern based on attributes of one or more domain specific concepts;
classifying the one or more concerns and grouping the one or more concerns to define blocks addressing the concerns;
mapping one re more concerns of the design pattern and the one or more functions; wherein the one or more concerns are fulfilled by the functions from the domain specific concepts;
specifying a relationship between the one or more concerns or the blocks using the design pattern meta-model; and
translate each element of the obtained domain meta model of the domain specific language into a plurality of keywords to create grammar of the domain specific language.

8. The system of claim 7, wherein the domain language module is further executed by the at least one processor to translate the grammar of the domain specific language to obtain target domain specific language using one or more third party compiler generators.

9. The system of claim 8, wherein the domain language module is further executed by the at least one processor to create one or more test meta-models to perform testing and simulation of the obtained target domain specific language.

10. The system of claim 7, wherein the domain knowledge is received from the user in the form of forms containing questions using generic system model (GSM) meta model that are utilized to create knowledge models.

11. The system of claim 7, wherein to select a design pattern includes facilitating the user in creating a new design pattern.

12. The system of claim 7, wherein the grammar of the domain specific language is editable for modifications by the user.

13. One or more non-transitory computer readable information medium having embodied thereon a computer program for executing a method for creating domain specific language, the method comprising of:
receiving domain knowledge of a problem domain from a user and creating one or more domain specific concepts by creating a plurality of knowledge models based on the domain knowledge received from the user, wherein the plurality of knowledge models are created by capturing the domain knowledge from the user using meta models; wherein the domain specific concepts are created in one or more functions and one or more attributes;
selecting a design pattern from one or more pre-stored design patterns;

mapping the selected design pattern to the one or more domain specific concepts using a design pattern meta model to obtain a domain meta model; wherein mapping the selected design pattern with the one or more domain specific concepts comprises:
  identifying one or more concerns of the design pattern based on attributes of one or more domain specific concepts;
  classifying the one or more concerns and grouping the one or more concerns to define blocks addressing the concerns;
  mapping one re more concerns of the design pattern and the one or more functions; wherein the one or more concerns are fulfilled by the functions from the domain specific concepts;
  specifying a relationship between the one or more concerns or the blocks using the design pattern meta-model; and
translating each element of the obtained domain meta model into a plurality of keywords to create grammar of the domain specific language.

\* \* \* \* \*